MULTIPLIER-DIVIDER INCLUDING A BRIDGE CIRCUIT

Filed Aug. 17, 1965

INVENTOR.
Donald S. Oliver
BY
Mueller, Aichele & Rauner
ATT'YS.

Dec. 3, 1968 D. S. OLIVER 3,414,721

MULTIPLIER-DIVIDER INCLUDING A BRIDGE CIRCUIT

Filed Aug. 17, 1965 2 Sheets-Sheet 2

INVENTOR.
Donald S. Oliver

BY

Mueller, Aichele & Rauner

ATT'YS.

United States Patent Office 3,414,721

Patented Dec. 3, 1968

3,414,721

MULTIPLIER-DIVIDER INCLUDING A BRIDGE CIRCUIT

Donald S. Oliver, Scottsdale, Ariz., assignor to Motorola, Inc., Franklin Park, Ill., a corporation of Illinois Filed Aug. 17, 1965, Ser. No. 480,315

12 Claims. (Cl. 235—195)

ABSTRACT OF THE DISCLOSURE

An analog-arithmetic circuit having four variable-capacitance diodes of identical characteristics, i.e., capacitance vs. voltage characteristics. Three of the diodes receive DC input signals for varying their respective capacitances with the fourth diode receiving a DC signal indicative of the output signal of the circuit for rebalancing the bridge such that the output signal is indicative of the arithmetic product-quotient of the three input signals. The variable-capacitance diodes are DC isolated and AC coupled together. Various interconnections of bridges utilizing the described cooperative relationship between the diodes are illustrated.

Figure 1:
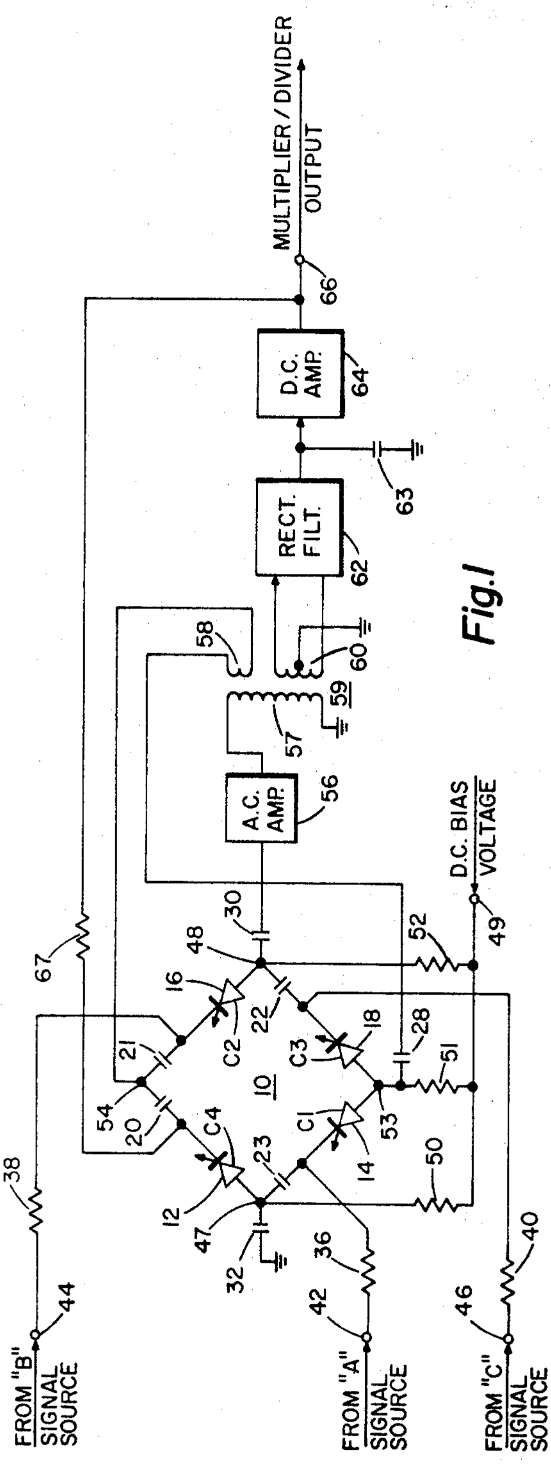

The application relates to an electronic computer circircuit and in particular to an analog multiplier-divider circuit.

It is desirable to have analog computers capable of performing various arithmetical operations with a high degree of accuracy for use in control processing systems. In order that such devices may be generally applicable they should be low in cost and require a minimum of input power for operation. The device should be capable of performing various arithmetical operations with a minimum number of changes to the device and should also be capable of providing high output power so that a large number of circuits may be operated by the computer.

It is, therefore, an object of this invention to provide an improved analog multiplier-divider circuit.

Another object of this invention is to provide an analog multiplier-divider circuit which is simple in construction, low in cost and is capable of performing different arithmetical operations with high accuracy.

Another object of this invention is to provide an analog multiplier-divider circuit having a high input impedance and a low output impedance.

A feature of this invention is the provision of an analog multiplier-divider circuit including a bridge circuit and an output circuit coupled thereto in which the impedance of three of the arms of the bridge are controlled by direct current input signals and the impedance of the fourth arm is controlled by a direct current output signal derived from the bridge and output circuit.

Another feature of this invention is the provision of an analog multiplier-divider circuit in which voltage variable capacitors are used as the bridge elements to provide bridge impedance elements which can be controlled by the direct current input signals.

The invention is illustrated in the drawings in which:

FIG. 1 is a partial schematic and partial block diagram of the analog multiplier-divider circuit; and FIGS. 2 through 8 are block diagrams showing various arrangements of the analog multiplier-divider circuit for carrying out different arithmetical operations.

In practicing this invention, a bridge circuit is provided in which each of the elements is a voltage variable capacitor. Three of the bridge elements are coupled to three separate input terminals and the capacitance of these elements is controlled by the direct current voltage applied to the input terminals. The capacitance of the fourth element of the bridge is controlled by the output direct current voltage from the analog multiplier-divider circuit. An input alternating current potential is applied to two opposite terminals of the bridge and an alternating current output potential is taken from the remaining two opposite terminals of the bridge. The alternating current output potential is amplified, rectified and filtered to develop an output direct current voltage. This output direct current voltage is applied to the fourth bridge element to vary the capacitance of this element to cause the bridge to balance itself. When the bridge is balanced the output direct current voltage is a function of the three input direct current voltages. This function is varied by the manner in which connections are made to the input terminals. Two or more of the analog multiplier-divider circuits may be coupled together to provide additional functions.

FIG. 1 is a partial schematic and partial block diagram of the circuit of this invention. A bridge circuit 10 is provided, the elements of which are voltage variable capacitors 12, 14, 16 and 18. The capacitance of capacitors 12, 14, 16 and 18 is determined by the direct current voltage applied to each of the capacitors.

Direct current input voltages from signal sources A, B and C are applied to input terminals 42, 44 and 46 respectively. These voltages represent the input quantities which are to be multiplied and divided and may be supplied from separate sources or from the output of another analog multiplier-divider circuit as will be described in a subsequent portion of the specification. The three input direct current voltages, representing quantities A, B and C, are applied to voltage variable capacitors 14, 16 and 18 respectively through resistors 36, 38 and 40 to establish the capacitance of these capacitors. A fourth direct current voltage is applied to voltage variable capacitor 12 from the output of direct current amplifier 64 through resistor 67.

An alternating current potential from secondary winding 58 of transformer 59 is applied to two opposite terminals 53 and 54 of bridge 10. An output alternating current voltage is taken from the remaining opposite terminals 47 and 48 of bridge 10 through capacitors 30 and 32 and applied to alternating current amplifier 56. Capacitors 20, 21, 22, 23 and 28 act as direct current blocking capacitors to permit the flow of alternating current through the bridge while limiting the flow of direct current to desired voltage variable capacitors. A fixed direct current bias voltage is coupled from terminal 49 through resistors 50, 51 and 52 to voltage variable capacitors 12, 14, 16 and 18 to offset the effect of the contact potential of these capacitors.

Direct current voltages, which are voltage analog representations of the quantities A, B and C, and which are to be operated upon arithmetically by the bridge circuit, are applied to respective input terminals 42, 44 and 46. These voltages bias bridge elements 14, 16 and 18 unbalancing the bridge. When the bridge is unbalanced in one direction an alternating current error signal is developed across terminals 47 and 48. This error signal is coupled through capacitors 30 and 32 to alternating current amplifier 56 where it is amplified. The amplified output signal from alternating current amplifier 56 appears across primary winding 57 of transformer 59. A secondary winding 58 couples a small portion of the alternating current signal to terminals 53 and 54 of bridge 10. Under these conditions bridge 10 and alternating current amplifier 56 form an oscillator circuit.

The output alternating current signal in transformer 59 is also coupled from secondary winding 60 to rectifier filter 62 where the alternating current signal is rectified. The direct current from rectifier filter 62 charges capacitor 63 and is amplified in direct current amplifier 64. The direct current from rectifier filter 62 charges capacto capacitor 12 through resistor 67 to bias voltage variable capacitor 12 in a manner which will balance the bridge. When the bridge is unbalanced and acts in conjunction with AC amplifier 56 as an oscillator, an increase in the direct current voltage from direct current amplifier 64 is required to cause the bridge to become balanced. The error signal produced across terminals 47 and 48 of the bridge is amplified and rectified to develop direct current voltage which increases until the error signal is reduced to a minimum value and the bridge becomes balanced. This error signal can be made as small as desired in practice by increasing the open loop gain of alternating current amplifier 56.

If the bridge is unbalanced in the other direction an alternating current signal applied to terminals 53 and 54 will undergo a phase change at terminals 47 and 48. Under these conditions the bridge and alternating current amplifier 56 will not oscillate and no signal will be coupled to rectifier filter 62 from secondary winding 60. The charge across capacitor 63 will be reduced through direct current amplifier 64, thus reducing the potential applied to voltage variable capacitor 12. This reduction in the voltage applied to voltage variable capacitor 12 will tend to balance the bridge. Again the voltage will change until an error signal of minimum value is produced at the output terminals 47 and 48. While the bridge circuits described in this application make use of a self-oscillating amplifier, any amplifier circuit which will produce an output direct current voltage which can be applied to the fourth arm of the bridge to balance the bridge may be used. In addition, the system is not limited to the use of voltage variable capacitors in the arms of the bridge, but any impedance element having equal and constant exponents of signal input versus impedance may be used in the bridge.

In bridge 10 the capacitances of capacitors 12, 14, 16 and 18 are represented by the quantities C4, C1, C2 and C3 respectively. When bridge 10 is balanced:

$$C1 \cdot C2 = C3 \cdot C4 \quad (1)$$

and $$C = \frac{K}{(V_s + V_o)^\gamma} \quad (2)$$

Where $V_o$ is the contact potential of the voltage variable capacitor and $V_s$ is the voltage applied to the diode to establish its capacitance. In the circuit of this invention $V_o$ is balanced out by the direct current bias voltage applied to terminal 49 and, therefore, Equation 2 can be reduced to $$C = \frac{K}{V_s^\gamma} \quad (3)$$

where K is a constant depending upon the type of diode used. Substituting the value of C from Equation 3 in Equation 1

$$\frac{K_1 K_2}{V_{s1}^\gamma \cdot V_{s2}^\gamma} = \frac{K_3 K_4}{V_{s3} \cdot V_{s4}^\gamma}$$

$$V_{s4} = \frac{V_{s1} \cdot V_{s2}}{V_{s3}} \quad (4)$$

where $$\frac{K_1 K_2}{K_3 K_4}$$

are chosen to be equal to unity;

$V_{s1}$ is the direct current voltage which is the analog of the quantity A;

$V_{s2}$ is the direct current voltage which is the analog of the quantity B;

$V_{s3}$ is the direct current voltage which is the analog of the quantity C; and $V_{s4}$ is the direct current voltage which is the analog of the output quantity X.

Therefore from Equation 4

$$X = \frac{AB}{C}$$

FIGS. 2 through 8 illustrate various arrangements for connecting input signals to the analog multiplier-divider circuit for producing a direct current output signal which is a desired function of the direct current input signals. Identical elements have the same reference numericals in each figure.

Figure 2:
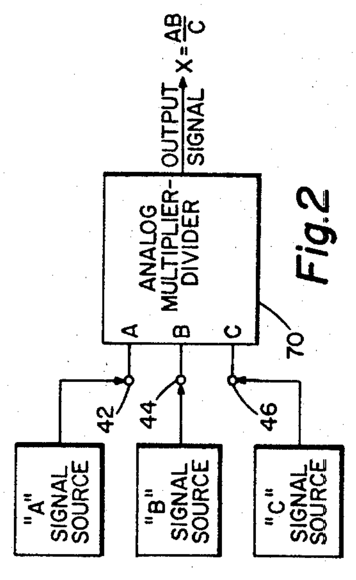

In FIG. 2 the basic connection is shown in which each of the input terminals 42, 44 and 46 of analog multiplier-divider 70 receives a separate direct current signal. The direct current signals are analog representations of the numerical quantities A, B and C which are to be multiplied and divided. The direct current signals A, B and C may be calibrated so that a particular predetermined voltage represents a particular number. For example, the number 1 may be represented by one volt while the number 2 is represented by two volts. In FIG. 2 the output signal is a direct current voltage which is the analog representation of the quantity X so that $$X = \frac{AB}{C}$$

Figure 3:
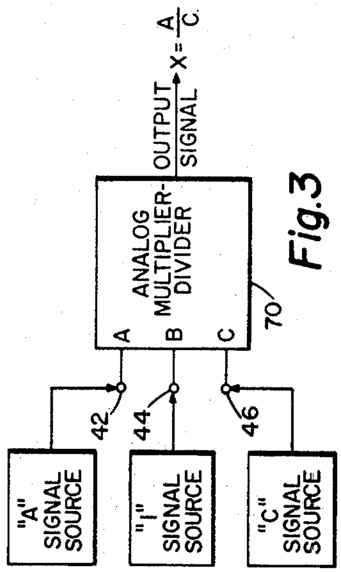

In FIG. 3 a B signal equal to "1" is provided at input terminal 44. Thus the output of analog multiplier-divider 70 is $$X = \frac{A \cdot 1}{C} = \frac{A}{C}$$

Figures 4, 5, 6, 7, 8:
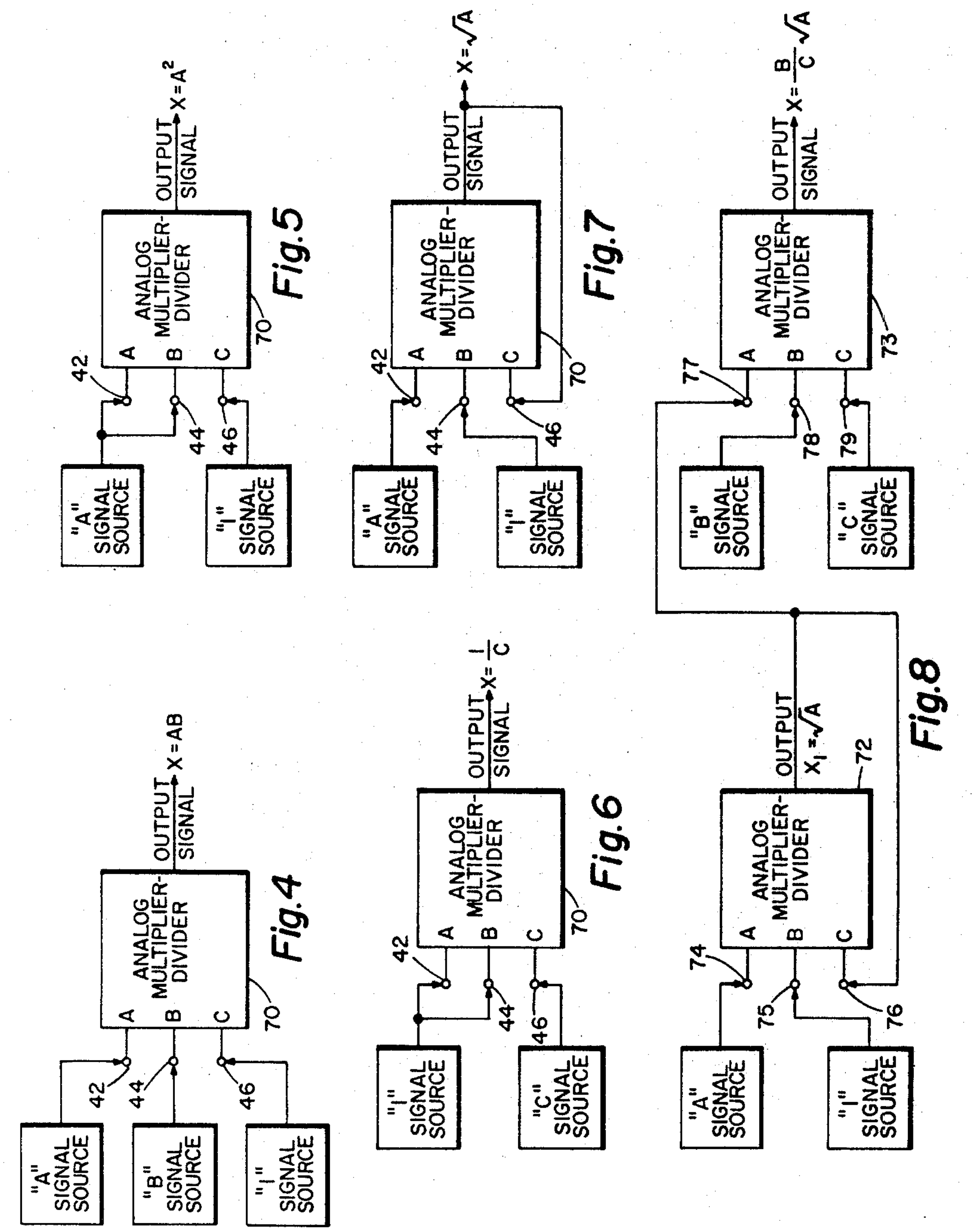

In FIG. 4 a C signal equal to "1" is coupled to input terminal 46 to provide an output signal which is $$X = \frac{AB}{1} = AB$$

In FIG. 5 an A signal is provided for both the input terminals 42 and 44 while a C signal equal to "1" is coupled to input terminal 46. The output signal from the analog multiplier-divider 70 is $$X = \frac{AA}{1} = A^2$$

In FIG. 6, A and B signals equal to "1" are coupled to terminals 42 and 44 while a C signal is coupled to input terminal 46. The output of analog multiplier-divider 70 is $$X = \frac{1 \cdot 1}{C} = \frac{1}{C}$$

In FIG. 7 an A signal is coupled to input terminal 42 and a B signal equal to "1" is coupled to input terminal 46. The output signal X is coupled back to input terminal 46. Thus $$X = \frac{A \cdot 1}{X}$$

$$X^2 = A$$

$$X\sqrt{A}$$

FIG. 8 illustrates a circuit in which more than one analog multiplier-divider unit is used. In this example an A signal is coupled to input terminal 74 and a B signal equal to "1" is coupled to input terminal 75. The output signal $X_1$ from analog multiplier-divider circuit 72 is coupled to input terminal 76. The output of analog multiplier-divider circuit 72, $X_1 = \sqrt{A}$ as in FIG. 7 above. The A signal applied to input terminal 77 of analog multiplier-divider 73 is $X_1$. B and C signals are coupled to input terminals 78 and 79 respectively. The output signal $X_2$ from analog multiplier-divider 73 is $$X_2 = \frac{X_1 B}{C} = \frac{B}{C}\sqrt{A}$$

The number of analog multiplier-divider circuits thus cascaded is not limited to two but any number, consistent with the operational requirements of the multiplier-divider circuits used, may be combined.

Thus a simple economical and accurate analog multiplier-divider circuit has been described. The analog multiplier-divider circuit is capable of performing a large number of arithmetical operations and more than one unit can be used to extend the number of operations possible.

What is claimed is:

1. A bridge-type analog multiplier-divider circuit, including in combination, a bridge circuit having four arms each with a separate voltage-controlled impedance element therein, said four arms being respectively connected in a series loop forming two input terminals and two output terminals, respectively, between opposite junctions of said arms, said voltage-controlled imperance element in each arm being electrically interposed between the ends of the respective arms, isolation means in said bridge circuit electrically interposed between said voltage-controlled impedance elements such that the impedance presented within the respective arms by said voltage-controlled impedance elements is independent one of the other and yet the impedance presented by each said voltage-controlled impedance element affects balance of the bridge circuit, alternating current signal means coupled to said input terminals for supplying an input alternating current signal thereto such that an output alternating current signal is developed across said output terminals in accordance with the balance or unbalance of the bridge as determined by the electrical impedance ratios between the various voltage-controlled impedance elements, three of said voltage-controlled impedance elements having input means adapted to receive direct-current control signals for controlling impedance of the respective devices and said isolation means preventing said direct-current control signal from directly affecting the electrical impedance of any but the voltage-controlled impedance element receiving such direct-current control signal, first circuit means coupled to said output terminal for receiving said output alternating-current signal and operative to develop an output direct-current signal from said output alternating-current signal, second circuit means coupling said output direct-current signal to a fourth one of said voltage-controlled impedance elements for establishing the impedance thereof in accordance with said direct-current signal amplitude such that the bridge is rebalanced for producing a minimum amplitude output alternating current signal and with said output direct-current signal being a function of the arithmetic relationships of the input signals in accordance with bridge circuit connections, and all said voltage-controlled impedance elements having substantially identical impedance-to-voltage characteristics.

2. A bridge-type analog multiplier-divider circuit, including in combination, a bridge circuit having first, second, third, and fourth arms, each arm having a pair of ends with a separate voltage-controlled electrical impedance element electrically interposed between the respective ends, said bridge further having a pair of opposing input terminals and a pair of opposing output terminals, an end of two of said arms being connected to each of said terminals such that all arms form a series loop circuit including said input and output terminals, means in said series circuit providing AC coupling and DC blocking electrically intermediate every one of said voltage-controlled impedance elements in the various arms, an alternating-current signal generator coupled to said input terminals for supplying an input alternating-current signal such that an output alternating-current signal is supplied across said output terminals in accordance with the electrical balance of the bridge circuit as determined by the impedances and the ratio of impedances of all said voltage-controlled impedance elements, said first, second, and third of said voltage-controlled impedance elements having input means adapted to receive direct-current control signals and respectively responsive to said direct-current control signals to alter the electrical impedance thereof for adjusting the balance-unbalance of the bridge in accordance therewith, amplifier and rectifier means connected to said output terminals for receiving said output alternating current signal and resposnive thereto to develop an output direct-current signal indicative of an arithmetic relationship between said direct-current control signals as respectively indicated by the impedances of said first, second, and third electrical impedance elements, circuit means coupling said output direct-current signal to said fourth voltage-controlled impedance element for establishing the electrical impedance thereof such that the amplitude of said output alternating-current signal is diminished whereby the amplitude of said output direct-current signal is a function of the arithmetic relationship of the electrical impedances and the ratio of such impedances of said first, second, and third electrical elements, said fourth voltage-controlled impedance element serving to reestablish the balance of the bridge as determined by said direct-current output signal.

3. A bridge-type analog multiplier-divider circuit including in combination, a bridge circuit having first, second, third, and fourth arms, each arm having a separate voltage-controlled variable capacitor electrically interposed between ends of such arm, said bridge further having an opposite pair of input terminals and an opposite pair of output terminals, one end of each said first and second and said third and fourth arms being respectively connected to said output terminals and another end of each said first and fourth and said second and third arms being respectively connected to said input terminals such that the arms form a series circuit including said input terminals and said output treminals, an alternating-current signal generator connected to said input terminals for supplying an input alternating-current signal thereto and the bridge circuit being responsive to said input signal as determined by the ratios of the impedances presented by said voltage-controlled variable capacitors to supply an output alternating-current signal across said output terminals having an amplitude indicative of the ratios of impedances presented by all said voltage-controlled variable capacitors, the greater the unbalance of said impedances the greater the amplitude of said output alternating-current signal, said first, second, and third of said voltage-controlled capacitors having input means adapted to receive a direct-current control signal and responsive to said direct-current control signal to alter the respective impedances in accordance therewith, means electrically interposed between said voltage-controlled variable capacitors for AC coupling said capacitors together and providing a DC blocking such that said direct-current control signals affect the impedance of only one of said voltage-controlled variable capacitors, amplifier and rectifier means connected to said output terminals to receive said output alternating-current signal and responsive to said output alternating-current signal to develop an output direct-current signal indicative thereof, circuit means coupling said output direct-current signal across said fourth voltage-controlled variable capacitor with said fourth voltage-controlled variable capacitor responsive to said direct-current signal to establish an impedance such that said direct-current signal alters the impedance of said fourth voltage-controlled variable capacitor in a direction to re-establish balance of the bridge circuit such that said direct-current control signal is indicative of the ratio of the impedances of said first, second, and third voltage-controlled variable capacitors, and said voltage-controlled variable capacitors having substantially identical voltage-variable characteristics such that said output direct-current signal linearly represents the arithmetic relationship of said direct-current control signals.

4. A bridge-type analog multiplier-divider circuit including in combination, a bridge circuit having first, second, third, and fourth arms each with a separate voltage-controlled variable capacitor and with a set of free ends with said voltage-controlled variable capacitor electrically interposed between said free ends, respectively, said bridge further having an opposite pair of input terminals and an opposite pair of output terminals, one free end of said first and second and third and fourth arms respectively connected to said output terminals and another free end of said first and fourth and said second and third arms respectively connected to said input terminals with said connections forming a series loop circuit in said bridge including all of said terminals and said arms, amplifier means having an input circuit connected to said output terminals and an output circuit coupled to said input terminals, said amplifier means and said bridge circuit forming an oscillatory circuit whereby an output alternating-current signal is developed across said output terminals, the amplitude of said output alternating-current signal being determined by the unbalance of the bridge in accordance with the reactances of said voltage-controlled variable capacitors, said amplifier means amplifying said output alternating-current signal and supplying the amplified alternator-current signal as an excitation signal around said input terminals, said bridge unbalance effecting a greater amplitude alternating current signal across said output terminals, said first, second, and third of said voltage-controlled variable capacitors having input means adapted to receive direct-current control signals for applying same across said voltage-controlled variable capacitors, said voltage-controlled variable capacitors responsive to said direct-current control signals to alter the reactances thereof for establishing a condition in the bridge indicative of said direct-current control signals, capacitors in said bridge circuit electrically interposed between said voltage-controlled variable capacitors for providing AC coupling therebetween and providing DC blocking such that each said direct-current control signal affects the reactance of one and only one voltage-controlled variable capacitor, rectifier means coupled to said output circuit of said amplifier means and responsive to said amplified output alternating-current signal to develop an output direct-current signal indicative thereof, circuit means coupling said output direct-current signal to said fourth voltage-controlled variable capacitor and said fourth voltage-controlled variable capacitor being responsive to alter its reactance thereof for rebalancing the bridge for reducing the amplitude of said output alternating-current signal toward a minimum amplitude.

5. A bridge-type analog arithmetic circuit, including in combination, a bridge circuit having first, second, third, and fourth bridge arms, respectively, with first, second, third, and fourth voltage-controlled variable capacitors with the capacitors being electrically interposed between ends of said arms, respectively, said first and third arms being coupled together and said second and fourth arms coupled together to form a pair of input terminals, said first and fourth arms being coupled together and said second and third arms being coupled together to form a pair of output terminals, amplifier means having an input circuit connected across said output terminals and an output circuit connected across said input terminals for supplying an alternating current excitation signal thereto, said amplifier means and said bridge circuit having a positive feedback for forming an oscillator such that an output alternating-current signal is developed across said output terminals having an amplitude in accordance with the unbalance of the bridge circuit or determined by the reactances of said voltage-controlled variable capacitors with a minimum amplitude when said bridge circuit is balanced, said first, second, and third voltage-controlled variable capacitors having input means adapted to receive first, second, and third direct-current control signals, respectively, and are respectively responsive to said direct-current control signals to vary the reactance of the respective voltage-controlled variable capacitors for imposing impedances in the bridge circuit indicative of the input signal amplitudes, capacitor means electrically interposed between said voltage-controlled variable capacitors for AC coupling said variable capacitors together such that the reactances of the variable capacitors affect the bridge balance and said capacitors isolating said direct current-control signals from said voltage-controlled variable capacitors such that one and only one voltage-controlled variable capacitor is affected by one direct-current control signal, rectifier means coupled to said output circuit of said amplifier means and responsive to said amplified output alternating-current signal to supply an output direct-current signal, circuit means coupling said output direct current signal across said fourth voltage-controlled variable capacitor and said fourth voltage-controlled variable capacitor being responsive to said output direct-current signal to establish a reactance in accordance therewith and of an impedance level tending to rebalance the bridge current to thereby minimize the amplitude of said output alternating signal and said output direct-current signal amplitude being indicative of an arithmetical relationship between said three input direct-current control signals.

6. A bridge-type analog-arithmetic circuit, including in combination, a bridge circuit having first, second, third, and fourth arms respectively having, first, second, third, and fourth voltage-controlled variable capacitors electrically interposed between ends of said arms, respectively, said bridge further having a pair of opposing input terminals and a pair of opposing output terminals, said first and second arms and said third and fourth arms being joined respectively at said input terminals and said second and third and said first and fourth arms being joined respectively at said output terminals such that a series circuit loop of said arms and said terminals is formed in the bridge circuit, amplifier means having an input circuit connected across said output terminals and an output circuit connected across said input terminals, said amplifier means and said bridge circuits as connected together forming an oscillatory loop-type circuit such that an alternating-current signal is developed therein with an output alternating-current signal developed across said output terminals having an amplitude indicative of the balance or unbalance of said bridge circuit, the amplitude of said output alternating current signal being increased as the bridge circuit unbalance is increased and having a phase in accordance with the direction of unbalance between the various arms thereof, said amplifier means amplifying said output alternating-current signal to supply an amplified output alternating-current signal, said first, second, and third voltage-controlled variable capacitors having input means adapted to receive separate and independent direct-current control signals representative of numerical quantities A, B, and C, respectively, and being responsive to said respective direct-current control signals to vary the reactance of the respective voltage-controlled capacitors to alter the balance or unbalance of the bridge in accordance with said direct-current control signals, capacitor means electrically interposed between each and every one of said voltage-controlled variable capacitors for providing AC coupling therebetween and for preventing direct-current signals from flowing between said voltage-variable capacitors such that each direct-current control signal affects the reactance of one and only one of said voltage-controlled variable capacitors, rectifier means connected to said output circuit of said amplifier means and responsive to said amplified output alternating-current signal to supply an output direct-current signal indicative of an arithmetical relationship of the numerical quantities A, B, and C, circuit means coupling said output direct-current signal to said fourth voltage-controlled variable capacitor and said fourth voltage-controlled variable capacitor being responsive to said output direct-current signal to adjust its electrical impedance to rebalance the bridge such that the amplitude of said output alternating-current signal tends to be reduced whereby the amplitude of said output direct-current signal represents an arithmetical relationship of said numerical quantities A, B, and C.

7. A bridge-type analog-arithmetic circuit, including in combination, a bridge circuit having first, second, third, and fourth arms with first, second, third, and fourth voltage-controlled variable capacitors electrically interposed between the ends of said arms respectively, said bridge further having a pair of opposing input terminals and a pair of opposing output terminals, said first and second and said third and fourth arms being respectively joined at said input terminals and said second and third and said fourth and first arms being respectively joined at said output terminals, amplifier means having an input circuit connected across said output terminals and an output circuit connected across said input terminals, said amplifier means and said bridge circuit forming an oscillatory loop whereby an alternating-current signal is generated therein with an output alternating-current signal being supplied across said output terminals, the amplitude of said output alternating-current signal being indicative of the relationship of the reactances of the various voltage-controlled variable capacitors, said amplifier means amplifying said output alternating-current signal to supply an amplified output alternating-current signal, said first, second, and third voltage-controlled variable capacitors having input means adapted to receive separate direct-current control signals representative of numerical quantities A, B, and C, respectively, said numerical quantity B having a constant amplitude indicative of the numerical quantity decimal one of said first, second, and third voltage-controlled variable capacitors being responsive to the direct current-voltage applied thereto to establish a reactance indicative of the respective direct-current control signal, capacitor means electrically interposed between said voltage-controlled variable capacitors such that each direct-current control signal affects the reactance of one and only one voltage-controlled variable capacitor and provides AC coupling therebetween such that the electrical reactance of each said voltage-controlled variable capacitor affects the balance and unbalance of the bridge circuit, rectifier means coupled to said output circuit of said amplifier means and responsive to said amplified output alternating-current signal to supply an output direct-current signal therefrom, circuit means coupling said output direct-current signal across said fourth voltage-controlled variable capacitor to establish the reactance thereof such that the bridge tends to be rebalanced for reducing the amplitude of said output alternating current signal to a minimum and such that the amplitude of said output direct-current signal is representative of an arithmetical relationship of the quantities A and C.

8. A bridge-type analog-arithmetic circuit, including in combination, a bridge circuit having first, second, third, and fourth arms with first, second, third, and fourth voltage-controlled variable capacitors electrically interposed between the ends of the respective arms, said bridge circuit further having a pair of opposing input terminals and a pair of opposing output terminals, said first and second arms and said third and fourth arms being joined respectively at said input terminals, and said second and third and said first and fourth arms being joined respectively at said output terminals, amplifier means having an input circuit connected across said output terminals and an output circuit connected across said input terminals, said amplifier means and said bridge circuit as connected together forming an oscillatory loop for developing an alternating current therein with an output alternating-current signal being supplied across said output terminals the amplitude of which is indicative of the balance or unbalance of said bridge circuit with the phase of the output alternating current signal being indicative of the direction of unbalance, if any, said amplifier means amplifying said output alternating-current signal to supply an amplified alternating-current signal, said first and second voltage-controlled variable capacitors having input means adapted to receive a direct-current control signal indicative of the numerical quantity A and said third voltage-controlled variable capacitor having input means adapted to receive a direct-current control signal indicative of the numerical quantity 1, said first, second, and third voltage-controlled variable capacitors being responsive to the respective direct-current control signals to establish a reactance therein in accordance with the amplitude of such control signal, and which affects the balance or unbalance of said bridge circuit, capacitor means interposed between each of said voltage-controlled variable capacitors for providing AC coupling therebetween such that the reactance of the voltage-controlled variable capacitors affects the balance of the bridge and provides DC blocking such that the respective direct-current control signals affect one and only one of said voltage-controlled variable capacitors except the control signal representing numerical quantity A which affects the reactance of said first and second voltage-controlled variable capacitors, rectifier means connected to said output circuit of said amplifier means for developing a direct-current output signal indicative of said amplified output-alternating current signal, circuit means coupling said output direct-current signal across said fourth voltage-controlled variable capacitor and said fourth voltage-controlled variable capacitor being responsive to said output direct-current signal to establish a reactance indicative of the amplitude of said output direct-current signal impedance such that the bridge tends to be balanced by the varying reactance of said fourth voltage-controlled variable capacitor whereby the amplitude of said output direct-current signal is a function of the square of the numerical quantity A.

9. A bridge-type analog-arithmetic circuit, including in combination, a bridge circuit having first, second, third, and fourth arms with first, second, third, and fourth voltage-controlled variable capacitors respectively electrically interposed between the ends of said arms, said bridge further including a pair of opposing input terminals and a pair of opposing output terminals, said first and second and said third and fourth arms being joined respectively at said output terminals and said second and third and said fourth and first arms being joined respectively at said input terminals, amplifier means having an input circuit connected across said output terminals and an output circuit connected across said input terminals, said amplified means and said bridge circuit as connected together forming an oscillatory loop for developing an alternating current therein such that an output alternating-current signal is supplied across said output terminals, the amplitude of said output alternating current signal being indicative of the balance or unbalance of said bridge circuit, each of said voltage-controlled variable capacitors presenting a reactance in said bridge circuit which affects the balance or unbalance of the bridge circuit, said amplifier means amplifying said output alternating-current signal to supply an amplified output alternating-current signal, rectifier means connected to said output circuit of said amplifier means and responsive to said amplified output alternating-current signal to supply an output direct-current signal therefrom, said first voltage-controlled variable capacitor having input means adapted to receive a direct-current control signal indicative of a numerical quantity A, said second voltage-controlled variable capacitor being adapted to receive a direct-current control signal representative of the numerical quantity one, and said third voltage-controlled variable capacitor being connected to said rectifier means to receive said output direct-current signal, said first, second, and third voltage-controlled variable capacitors being responsive to the respective supplied direct-current voltages applied thereto to establish a reactance indicative of the amplitude of such direct-current signals, respectively, circuit means coupling said output direct-current signal to said fourth voltage-controlled variable capacitor and said fourth voltage-controlled variable capacitor being responsive to said output direct-current signal to establish a reactance indicative of the amplitude of said output direct-current signal and said output direct-current signal having an amplitude varying in accordance with the reactances of said first, second, and third voltage-controlled variable capacitors, and causing the reactance of said fourth voltage-controlled variable capacitor to vary such that the bridge tends to be rebalanced for reducing the amplitude of said output alternating-current signal to a minimum such that the amplitude of said output direct-current signal is indicative of the square root of the numerical quantity A.

10. The bridge-type analog arithmetical circuit of claim 9 further including bias means connected across each said voltage-controlled variable capacitor, said voltage-variable capacitors each having a rectifying junction with a voltage-variable capacitive portion and a constant-capacitive portion in its reactance, said bias means forward-biasing said junction such that the effect of said constant-capacitive portion is removed from each and every one of said voltage-variable capacitors such that the reactance presented in the bridge circuit by each of said voltage-variable capacitors is only the voltage-variable portion of the capacitor reactance.

11. A plurality of bridge-type analog arithmetic circuits, each circuit including in combination, a bridge circuit having four arms each with a separate voltage-controlled impedance element therein electrically interposed between the ends of said arms respectively, said bridge circuit further having a pair of opposing input terminals and a pair of opposing output terminals, the arms of said bridge circuit being connected between an input terminal and an output terminal, respectively, such that a series-loop circuit is formed in the bridge circuit, an alternating-current signal generator coupled across said input terminals for supplying an input alternating-current signal thereto such that an output alternating-current signal is supplied across said output terminals, the amplitude of said output alternating-current signal being indicative of the relationship of the impedances of said voltage-controlled impedance elements with an unbalance in said bridge circuit causing an increase in amplitude of said output alternating-current signal with the phase of said output alternating-current signal being indicative of the direction of unbalance, three of said voltage-controlled impedance elements having input means adapted to receive direct-current control signals and responsive to said direct-current control signals to establish an electrical impedance in said arms indicative of the amplitude of said direct-current control signals, respectively, capacitor means electrically interposed between said separate voltage-controlled impedance elements for providing AC coupling therebetween such that the impedances presented by said voltage-controlled impedance elements affect the bridge balance or unbalance and providing DC blocking such that each direct-current control signal affects one and only one of said voltage-controlled impedance elements, amplifier and rectifier means coupled to said output terminals for receiving said output alternating-current signal and supplying an output direct-current signal therefrom, first circuit means coupling said output direct-current signal across said fourth voltage-controlled impedance element and said fourth voltage-controlled impedance element responsive to said output direct-current signal for establishing an impedance therein such that said bridge circuit tends to be rebalanced for reducing the amplitude of said output alternating-current signal toward a minimum, and second circuit means coupling said output direct-current signal from at least one of said plurality of bridge-type arithmetic circuits to at least one of said three voltage-controlled impedance elements in another one of said bridge-type arithmetic circuits.

12. A plurality of bridge-type analog-arithmetical circuits, each circuit including in combination, a bridge circuit having four arms each with a separate voltage-controlled variable capacitor electrically interposed between the ends of said arms respectively, said bridge circuit further including a pair of opposing input terminals and a pair of opposing output terminals with each arm connected between a different input and output terminal such that a series circuit loop of four arms including all of said terminals is formed, amplifier means having an input circuit connected across said output terminals and an output circuit connected across said input terminals, said amplifier means and said bridge circuit when connected together forming an oscillatory loop to develop an alternating current therein such that an output alternating-current signal is supplied across said output terminal, the amplitude of said output alternating-current signal being indicative of the relationship of the reactances of the various voltage-controlled variable capacitors, said amplifier means amplifying said output alternating-current signals to supply an amplified output alternating-current signal, three of said voltage-controlled variable capacitors having input means adapted to receive direct-current control signals and responsive thereto to provide a reactance in the bridge circuit indicative of the amplitude of such direct current control signals, respectively, capacitor means electrically interposed between all of said voltage-controlled variable capacitors for providing AC coupling therebetween such that the presented reactances of the various voltage-controlled variable capacitors affect the bridge balance-unbalance and providing DC blocking such that received direct-current control signals respectively affect one and only one of said voltage-controlled variable capacitors as connected thereto, rectifier means coupled to said output circuit of said amplifier means and responsive to said amplified output alternating-current signal to develop an output direct-current signal, first circuit means coupling said output direct-current signal to said fourth voltage-controlled variable capacitor and said fourth voltage-controlled variable capacitor being responsive to said output direct-current signal to establish a reactance tending to rebalance the bridge circuit such that the ratios of the first-to-third and second-to-fourth reactances are equal such that the amplitude of said output alternating-current signal is reduced toward a minimum, and second circuit means coupling means coupling said output direct-current signal from at least one of said plurality of bridge-type analog arithmetic circuits to at least one of said three voltage-controlled variable capacitors in another one of said bridge-type analog arithmetic circuits.

References Cited

UNITED STATES PATENTS

| | | | |
|---|---|---|---|
| 2,968,180 | 1/1961 | Schafer | 235—179 X |
| 3,030,569 | 4/1962 | Chilton | 235—179 X |
| 3,070,306 | 12/1962 | Du Bois | 235—194 X |
| 3,070,309 | 12/1962 | Fluegel | 235—179 X |
| 3,117,242 | 1/1964 | Slack | 235—194 X |
| 3,202,808 | 8/1965 | Meixell | 235—194 |

MALCOM A. MORRISON, *Primary Examiner.*

J. F. RUGGIERO, *Assistant Examiner.*